June 23, 1959 W. C. WOODS 2,892,135
SMALL ENCLOSED ELECTRICAL DEVICE
Filed Jan. 24, 1957
Fig. 1
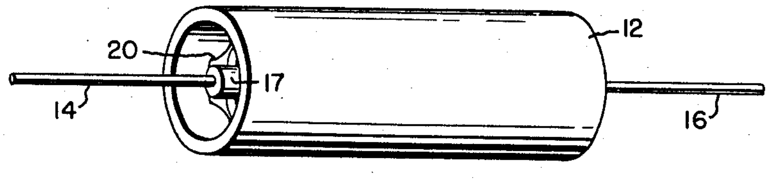
Fig. 2
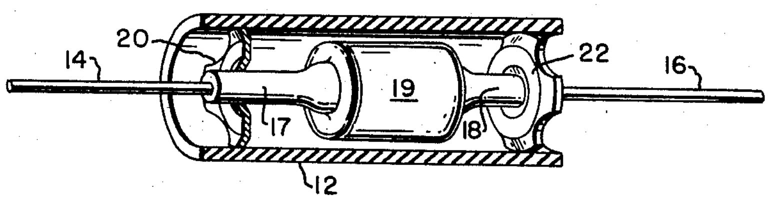
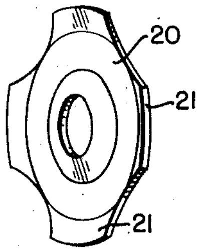
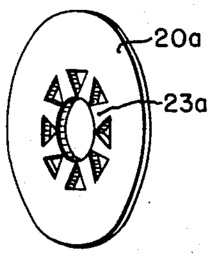
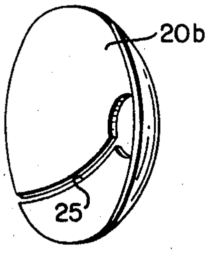
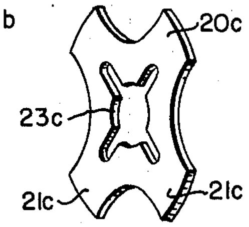
Fig. 3 Fig. 4 Fig. 5 Fig. 6
INVENTOR.
WILLIAM C. WOODS
BY
Kenway, Jenney, Witter & Hildreth
ATTORNEYS

United States Patent Office 2,892,135

Patented June 23, 1959

2,892,135

SMALL ENCLOSED ELECTRICAL DEVICE

William C. Woods, Lynn, Mass., assignor, by mesne assignments, to Sylvania Electric Products Inc., Wilmington, Del., a corporation of Delaware Application January 24, 1957, Serial No. 636,179

8 Claims. (Cl. 317—234)

This invention relates in general to small electrical devices such as semiconductor diodes and in particular, to the envelope or shell structure of devices of this nature.

For some years there has been a trend toward automation in almost all industries. This trend is nowhere more apparent than in the electronics industry. Concurrent with the trend toward automation in the electronics industry has been an equally apparent trend toward miniaturization of components. For the most part, automation and miniaturization have been complementary, but situations have arisen where the two are mutually incompatible.

As a result of miniaturization, many small components such as semiconductor diodes or rectifiers, resistors, capacitors and pulse transformers, by way of example, necessarily have been made in unusual shapes. These shapes do not easily lend themselves to handling and assembly operations in the manufacture of systems and apparatus where such operations are of a highly automated nature. Although the present invention is applicable to all of these components, for reasons hereinafter set forth in more detail, it is particularly applicable to semiconductor diodes.

The rectifying properties of semiconductor diodes have been known since the earliest days of radio. For many years, however, such diodes were put aside in favor of vacuum tube diodes. Just prior to World War II and during the war period, interest in semiconductor diodes was reawakened. There are numerous technical reasons for this renewed interest and literally millions of semiconductor diodes were made and used, particularly in detection equipment, during the war period. The commonest type of diode used was cylindrical in shape and included machined brass pieces at each end which were physically connected to a semiconductor element and a whisker respectively. Separating the two end pieces and enclosing the element and whisker was a cylindrical ceramic member. The two end pieces and the ceramic member were formed by processes which enabled the external dimensions to be held to extremely close tolerances.

With further advance of the art, however, improved techniques led to the manufacture of rectifying diodes which consist essentially of a piece of cylindrical glass tubing into which short lengths of metal tubing or eyelets are sealed. Two studs, one carrying a semiconductor element and the other a whisker, are then inserted through the eyelets at the opposite ends of the glass body until the whisker on the one stud contacts the semiconductor element on the other stud in such a fashion as to produce the desired electrical characteristics. At this point, the studs are soldered in place in the eyelets.

During the period of the development of this later type of diode, advances were being made in the art of automation. In the manufacture of such complex devices as computers, relatively new techniques such as those employing printed circuits made their appearance. Machinery was developed for automatically inserting components into position on the printed circuit base. This machinery, being automatic in nature, is designed for magazine or tape loading of such components as diodes. As each printed circuit base is fed beneath the operating head of the machine, a diode is released from the magazine or escapement device and fed into position on the printed circuit base.

Unfortunately, the more recently developed diodes comprising a cylindrical glass body portion having metallic eyelets sealed into the ends of the body cannot be held to the same tolerances and symmetry maintained in the older type diodes formed of machined parts. As a result, quite often the magazine and feeding mechanism of the automatic machinery become jammed when a diode of a relatively unsymmetrical external contour rocks in the magazine trough or in the feeding mechanism.

Over and above the problems of jamming in automatic machinery, these later type diodes have been subject to improvement in other respects. Their extremely small size and lack of any substantial protruding metallic surface cuts down their ability to radiate heat. Despite the improvements in electrical characteristics and in performance of the new diodes, there also have been some structural sacrifices made. The fact that the diode includes two glass-to-metal seals adds to its fragility. A further weak point is inherent in the structures inasmuch as soldering pigtails are usually butt-welded to the studs on which the sensitive elements are mounted in order to provide conducting leads from the cooperating rectifying elements. Bending of the pigtails, as is common when the diodes are loaded into automatic machinery, quite often places severe strains not only on the glass-to-metal seals, but also, on the welds formed between the pigtails and the studs. The fragility of the structures is also a factor to be considered in handling, packing and shipping the diodes.

Still another factor which detracts from the desirability of the glass-to-metal seal diodes is the fact that their small and somewhat unsymmetrical exposed surfaces cannot easily be marked for identification as to type and source. Then too, in some operations the pigtails of the diode are actually soldered into the circuit in which they are to be used. When these leads are cut to relatively short lengths, the heat which is conducted into the sensitive elements of the diode can cause harmful reactions. The possibility of shorting of the elements of the diode to other components or to leads connected to other components, especially in printed circuits, constitutes still another problem.

Therefore, it is a primary object of the present invention to improve the structural characteristics of small electrical devices.

It is a further object of the present invention to protect small electrical devices from the hazards of shipping, handling and installation.

It is a still further object of the present invention to provide electrical devices which are capable of utilization in automatic machinery.

It is a still further object of the present invention to provide semiconductor diodes which have rugged structural characteristics and which may be easily identified as to type and source.

It is another object of the present invention to provide semiconductor diodes which may be used without danger of shorting in applications where components are closely spaced.

It is still another object of the present invention to provide a semiconductor diode structure which dissipates heat efficiently.

In general, the present invention comprises an envelope or body enclosing the active translating elements of the device, a sleeve or envelope preferably of insulating material into which the body enclosing the translating elements may be easily inserted, and resilient clips or washers for retaining the body in position within the sleeve after insertion. The sleeves are preferably fabricated of a material which may be formed with squared ends and in which external dimensions may be maintained within very close tolerances. The resilient clips are preferably fabricated of a metal which is capable of being stamped or otherwise formed in a configuration such as to maintain the envelope enclosing the translating elements in position within the sleeve. In addition, the heat radiating characteristics of the clips should be as efficient as possible. For a better understanding of the present invention, together with other objects, features and advantages, reference should be made to the following description of a preferred embodiment thereof which is to be read in conjunction with the attached drawing in which:

Fig. 1 is a perspective view of a completed assembly of a semiconductor diode including clips and sleeve, Fig. 2 is similar to Fig. 1 but the sleeve is cut away to illustrate the fitting of the diode and clips therein, Fig. 3 is an embodiment of the clip used in the structures of Figs. 1 and 2 having finger contact with the sleeve and unbroken contact with the diode lead, Fig. 4 is an alternative embodiment of the clip having unbroken contact with the sleeve and finger contact with the diode lead, Fig. 5 is another alternative embodiment of the clip having unbroken contact with the sleeve and unbroken contact with the diode lead, Fig. 6 is still another alternative embodiment of the clip having finger contact with both the sleeve and the diode lead.

In Fig. 1 there is shown a cylindrical sleeve or envelope 12 of rolled laminated paper tubing impregnated with a phenolic resin. The precise type of material used for the sleeve is not essential to the invention, inasmuch as extruded tubing of such materials as polystyrene, polyethylene, polymerized tetrafluoroethylene, or many other electrically insulating materials may be used to form the sleeve. Extending from opposite ends of the sleeve 12 are pigtails 14 and 16 which may be of copper tinned for facilitating soldering of the pigtails to terminal posts or to other components. Again, the exact material used is not essential to the invention, any solderable conductive material being generally suitable. Each of the pigtails is butt-welded or mechanically attached to a stud as may be seen at the point where pigtail 14 is secured to stud 17. The clip 20 inserted in the sleeve between the stud 17 and the inner wall of the sleeve 12 is partially visible in Fig. 1.

In Fig. 2 wherein the sleeve is cut-away, the mounting and disposition of the various components is more easily seen and understood. The cylindrical glass body 19 enclosing the semiconductor and contact elements of the diode has an outside diameter slightly less than the inside diameter of the sleeve 12. This choice of dimensions, for one thing, permits the glass body or envelope to be slipped easily into the sleeve during the assembly process.

The generally annular metallic clips 20 and 22, which are identical in structure have central apertures slightly smaller than the outside diameter of the studs 17 and 18 which extend axially from envelope 19 and are electrically connected to the semiconductor element and contact element respectively. As may be seen in Fig. 2, and better in Fig. 3, the metallic clips include peripheral fingers 21. These external fingers actually are slightly bent out of the plane of the main portion of the body of the metal clip. The central opening provided in the clips also is slightly displaced from the plane of the main body of the clip in the same direction as the peripheral fingers. This results in a conically tapered portion running from the opening to the body of the clip.

When the final assembly is being made, the cylindrical glass envelope enclosing the rectifying elements and having leads extending axially therefrom is placed in the sleeve. A metal clip is slipped over the pigtail of each lead with the fingers facing outwardly as shown in the drawing. The parts are then placed in a fixture where the sleeve and glass envelope are maintained in proper relationship while the metal clips are forced into proper position. The clips fit closely over the studs of the leads, and the resilience of the metal clips and the bends in the fingers cause the clips to engage the inner surface of the sleeve wall and maintain the various elements of the device in position.

Greater detail of the structure and configuration of metal clips 20 and 22 may be seen in Fig. 3. The outwardly extending fingers 21 are bent slightly to the left as shown and the metal around the inner opening is in the form of a cone with the opening at the apex of the cone to facilitate achieving a press fit of the clip on the stud. The overall diameter of the metal clip is somewhat greater than the inside diameter of the sleeve 12 and the metal used is preferably quite resilient. Thus, when the clips are pressed into the sleeves, they have a strong clamping effect and they retain the diode body out of contact with the sleeve wall. For purposes which will be explained in greater detail hereinafter, the edge of the clip defining the inner opening provides an unbroken contact around the circumference of the stud, whereas the fingers 21 provide contact between only a portion of the inner wall of the sleeve and the clip.

In Fig. 4, the situation is reversed. In this embodiment, an unbroken contact is provided about the entire periphery of the metal clip and only finger contact is had between the clip and the stud.

Fig. 5 illustrates still another embodiment wherein the contact between sleeve and clip is unbroken about the entire periphery of the clip and the same is true between the stud and the edge marking the inner opening in the clip. The clip of Fig. 5 is also made somewhat larger than the internal diameter of the sleeve 12. A slot 25 is cut radially from the inner opening to the outer periphery and the clip is deformed slightly with the slot tending to close as the clip is inserted in the sleeve. After insertion, the resilience of the metal and its tendency to assume the largest possible diameter by reopening the slot provide a strong frictional contact between the wall of the sleeve and the clip and between the edge defining internal opening of the clip and the stud. In Fig. 6 is an embodiment which includes fingers **21*c* which contact the interior surface of the sleeve 12 and also fingers 23*c*** which, of course, contact the stud of the diode.

The various configurations of the clip are merely a few examples of the various embodiments which could be used depending upon the characteristics required in end use of the encased diode, particularly with regard to dissipation of heat which is especially desirable. In those situations where the transfer of heat is intended to be accomplished by radiation primarily, it would be preferable to use a clip wherein the contact with the stud extends about the clip for a full 360 degrees. In contrast, if for example, a fluid such as air or gas were being forced through the sleeve to provide cooling, it would be much more desirable to provide openings through which the air could pass. Of the units shown, that with perhaps the least material providing maximum openings would be that shown in Fig. 6. Some convection currents are possible, of course, with the embodiments shown in Figs. 3 and 4 as well. For cooling of this type, the embodiment shown in Fig. 5 would be least desirable. It should also be noted that it might at times be desirable to perforate the sleeve 12 itself to obtain even greater circulation of fluid when that type of cooling is being utilized.

The invention should not be limited to structures including only the clips shown. These have been chosen as typical only because they show finger contact with either the sleeve or the stud combined with either finger or unbroken contact with the sleeve, and full contact with the stud combined with either finger or full contact with the sleeve. Clips of other configurations may equally well be used depending upon the requirements of the applications for which they are designed. The fact that the metal clips are most easily formed by stamping is of importance because it becomes possible to set up a machine wherein the stampings themselves are made and inserted at the same operating position.

Insofar as the use of the components in automatic machinery is concerned, the external surface of the sleeve 12 is readily held in rather tight tolerances. Its ends are uniform and in a plane perpendicular to its axis. In addition, the presence of the sleeve permits a considerable amount of bending of the pigtails with no strain on the glass-to-metal seals of the device. Although it is still possible to set up some strain on the welds between the pigtails and the studs of the leads, this too is lessened by the extension of the ends of the sleeve beyond the ends of the stud which inhibits inadvertent bending of the pigtails about very small radii. The resistance of the entire device to shock and other hazards of packing and shipping is tremendously increased because as may be seen particularly well in Fig. 2, the glass diode envelope itself is suspended within the sleeve. Only the studs are in contact by way of the clips with the wall of the sleeve.

When the pigtails of the diode are being soldered into a circuit, the clips provide a by-pass for the heat from the soldering operation, substantially reducing the amount of heat conducted into the sensitive elements within the glass envelope itself. Furthermore, when components are crowded close together in an installation, the extension of the sleeves serves yet another purpose. The only exposed active portions of the diode which could be shorted are the pigtails themselves and these of course, may be cut as short as is desired. The surface of the sleeve itself provides a sufficiently smooth and large surface to accept markings for identification as well as manufacturer's trade and code marks.

Numerous modifications within the purview of the present invention could be made without departing from the basic concepts. A preferred embodiment has been shown and described but the invention should be limited only as is required by the spirit and scope of the appended claims.

What is claimed is:

1. An electrical device comprising a first cylindrical envelope having a conducting lead extending from each end thereof, a second cylindrical envelope surrounding said first envelope and a resilient clip engaging each lead and the inner surface of said second envelope to maintain said envelopes in predetermined spaced apart relation.

2. An electrical device comprising a first cylindrical envelope including a section of insulating material and enclosing cooperating rectifying elements, conducting leads electrically connected to said elements and extending from the ends of said envelope, a second envelope of insulating material of greater length than said first envelope surrounding and extending beyond said first envelope at each end thereof, and a resilient clip engaging each lead and the inner surface of said outer envelope to maintain the inner and outer envelopes in predetermined spaced apart relation.

3. A semiconductor diode comprising a cylindrical glass envelope enclosing cooperating rectifying elements, cylindrical studs of smaller diameter than said envelope electrically connected to said elements and extending axially from the ends of said envelope, a cylindrical sleeve of insulating material, the inside diameter of said sleeve being greater than the outside diameter of said glass envelope, and a resilient metallic clip engaging the cylindrical surface of each of said studs, said clips also engaging the inside wall of said sleeve and supporting the envelope and sleeve in predetermined spaced apart relation.

4. A device as defined in claim 3 wherein each of said metallic clips has a central circular opening formed therein, the edge of the clip defining said opening being in contact with the entire periphery of the stud which the clip engages.

5. A device as defined in claim 3 wherein each of said metallic clips has a central opening formed therein, said central opening being defined by a plurality of fingers, the ends of said fingers of each clip being in contact with the stud with which the clip is in engagement.

6. A device as defined in claim 3 wherein each of said metallic clips has a circular periphery in engagement along the length thereof with the inner surface of said sleeve.

7. A device as defined in claim 3 wherein each of said metallic clips has a peripheral surface formed into a plurality of fingers, the ends of said fingers being in contact with arcuate portions of a circular section of the inside wall of said sleeve.

8. A semiconductor diode comprising a cylindrical glass envelope enclosing semiconductor and contact elements arranged in rectifying cooperation, cylindrical metallic studs of smaller diameter than said envelope electrically connected to said elements and extending axially from the ends of said envelope, a cylindrical sleeve of insulating material having squared ends, the inside diameter of said sleeve being larger than the outside diameter of said glass envelope and the length of said sleeve being greater than the overall length of said glass envelope and said axially extending metallic studs, a generally annular resilient metallic clip pressed over each of said studs, the edge defining the internal opening of each of said clips being in firm contact with the peripheral surface of the stud over which it is pressed and the outer periphery of each of said clips being in firm contact with the internal surface of said sleeve, said envelope being supported by said clips in spaced relationship to the internal wall of said sleeve.

References Cited in the file of this patent

UNITED STATES PATENTS

| | | |
|---|---|---|
| 2,651,745 | Marrow | Sept. 8, 1953 |
| 2,652,522 | Vanderhoof | Sept. 15, 1953 |